United States Patent [19]
Feinstein

[11] Patent Number: 6,019,514
[45] Date of Patent: Feb. 1, 2000

[54] LINEAR GUIDE SYSTEM HAVING A FLEXURE

[75] Inventor: Alan Feinstein, Commack, N.Y.

[73] Assignee: Bayside Controls, Inc., Port Washington, N.Y.

[21] Appl. No.: 09/031,907

[22] Filed: Feb. 27, 1998

[51] Int. Cl.[7] .................................................. F16C 29/12
[52] U.S. Cl. .............................. 384/37; 384/38; 384/43; 384/57
[58] Field of Search ................................ 384/45, 44, 37, 384/38, 57

[56] References Cited

U.S. PATENT DOCUMENTS

| | | | |
|---|---|---|---|
| 3,780,619 | 12/1973 | Kitamura et al. | 384/9 X |
| 4,637,738 | 1/1987 | Barkley | 384/38 |
| 5,139,848 | 8/1992 | Grafen et al. | 384/9 X |
| 5,143,454 | 9/1992 | Morita | 384/37 |
| 5,176,454 | 1/1993 | Schlereth | 384/45 |
| 5,181,780 | 1/1993 | Morita | 384/8 |
| 5,247,891 | 9/1993 | Morita | 384/45 X |
| 5,249,967 | 10/1993 | Iida | 384/45 |
| 5,388,913 | 2/1995 | Cawley et al. | 384/38 |

*Primary Examiner*—Thomas R. Hannon
*Attorney, Agent, or Firm*—Collard & Roe, PC

[57] ABSTRACT

The invention is a linear guide system having a flexure that absorbs internal stresses in the system while still maintaining sufficient rigidity required for a precise linear guide system. These internal stresses may be caused by thermal expansion of components, misalignment of guide rails or vibration of components during operation. The guide system comprises at least two parallel extending guides supported by a base. Slidably attached to the guides are a plurality of pucks or sliders. In addition, the system includes at least one movable slide plate positioned above the pucks by two sets of vertical supports. The first set of vertical supports fix the slide plate to the pucks in both a horizontal and vertical direction while the second set of vertical supports fix the slide plate to the pucks in only the vertical direction. Finally, the guide system includes at least one flexure, consisting of a thin metal plate. The flexure is located between the slide plate and the pucks and attaches to the second set of vertical supports to provide horizontal stability and rigidity within the system while still providing sufficient flexibility to absorb the internal stresses.

5 Claims, 5 Drawing Sheets

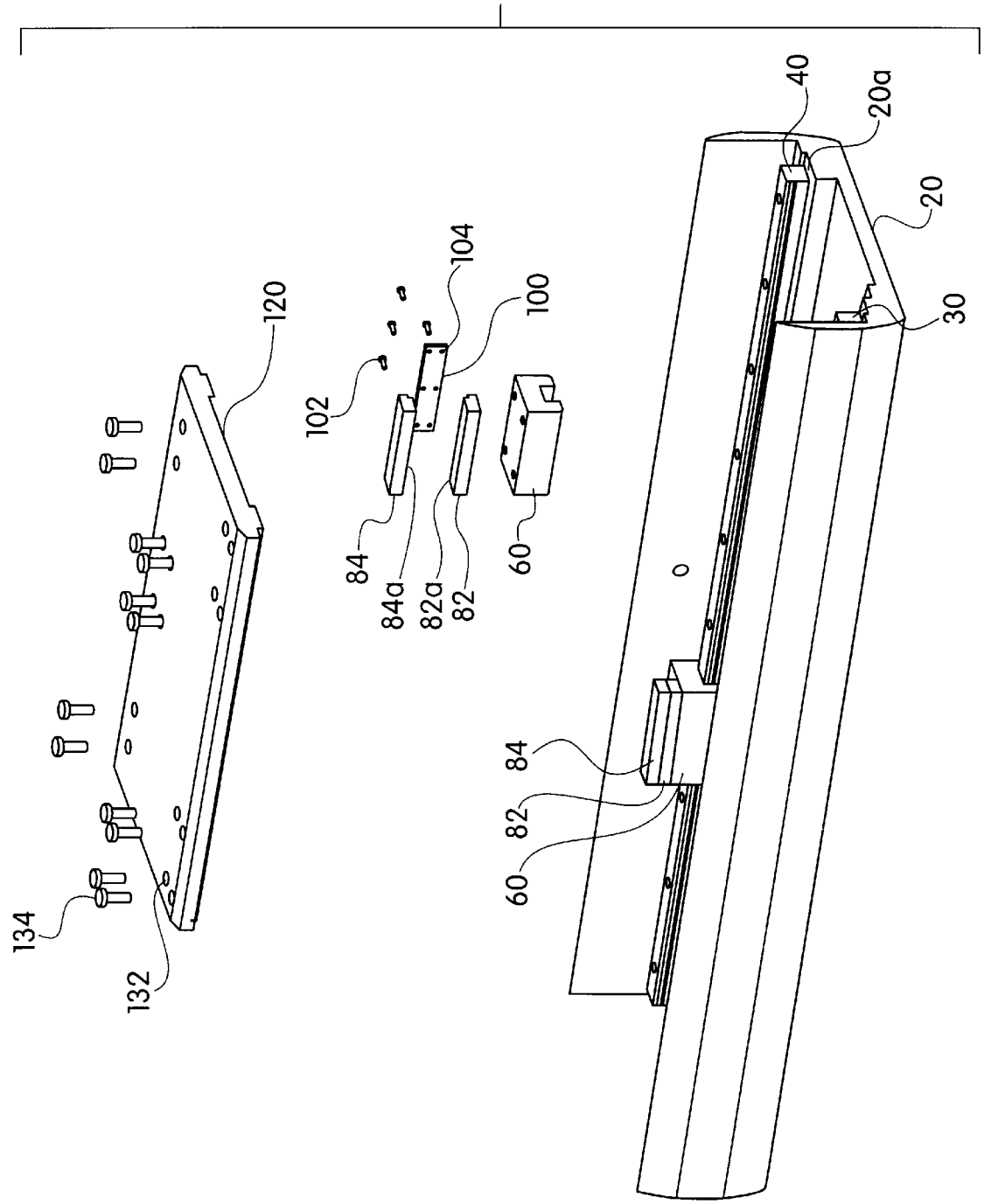

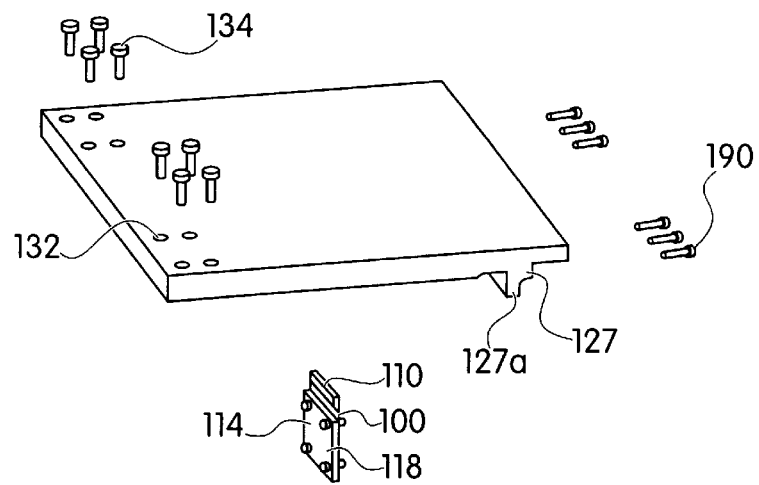
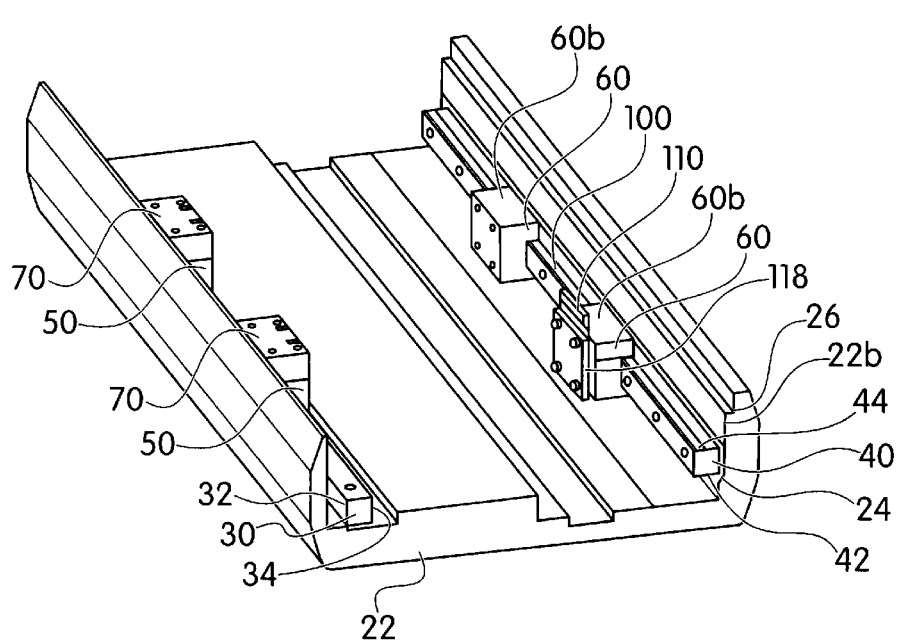
FIG. 5

LINEAR GUIDE SYSTEM HAVING A FLEXURE

BACKGROUND OF THE INVENTION

1. Field of the Invention

The invention relates to a novel linear guide system that has a built in flexure to absorb internal stresses on the system due to thermal expansion, vibration of recirculating ball bearings and improper alignment of the linear guide rails.

2. The Prior Art

To reduce wear within a linear guide system, an elastic component can be installed to absorb internal stresses and vibration within the system. Internal stresses on the system can be caused by a misalignment of guide rails, thermal expansion of components or vibration during operation. For example, during operation, a drive source coupled to a slide plate may heat up, causing parts within the system to expand. As these parts expand, they put pressure on the other parts. Therefore, the elastic component or flexure is introduced into the system to allow the system to adapt to this expansion without putting additional pressure on other components.

Various methods are known for providing elastic components within a linear guide system. For example, U.S. Pat. Nos. 5,143,454 and 5,181,780 to Morita disclose a linear motion guide which contacts a rail through a U-shaped contact member An elastic U-shaped member is located between the contact member and the linear motion guide to absorb the internal stresses on the linear motion guide due to thermal expansion of the guide or rails. The elastic member can also take several different forms. For example, the elastic member can comprise three different sections; two lateral sections and a top section. In addition, the elastic member may be enclosed with an elastic filler located inside.

U.S. Pat. No. 3,780,619 to Kitamura et al. discloses a gantry mill that is free from the effects of thermal deformation. The mill is designed so that there are spacers provided to allow thermal deformation of the mill. In addition the mill has stoppers designed to stop the thermal expansion of a bridge member on the mill.

U.S. Pat. No. 5,139,848 to Grafen et al. discloses an anti-friction combination section with a differential expansion means. The invention comprises a combination section consisting of a base section and a covering section. The covering section is of anti friction material while the base section is divided into partial lengths that are interconnected by deformable bridges. While the prior art discloses linear motion systems having a flexible member for adjustment, these systems do not provide a flexure that is connected between a slide plate and a puck. In addition the prior art does not disclose a flexure that maintains a sufficient balance between the flexibility necessary to absorb internal stresses on the system and the rigidity necessary for highly precise guide systems.

SUMMARY OF THE INVENTION

The purpose of the invention is to provide significantly better performance by altering the method of mounting traditional linear guide bearings.

It is therefore an object of the invention to provide a linear motion system that remains reliable throughout operation by using a flexure to absorb internal stresses on the system. These stresses can be created by thermal expansion, vibration of recirculating ball bearings, and improper alignment of the linear guide rails. Another object of the invention is to create a flexure for a linear guide system that maintains firm support in both horizontal and vertical directions while still allowing the guide to be flexible under stress. Another object of the invention is to create a flexure design that allows for two configurations of a linear motion guide system. Still another object of the invention is to create a linear motion guide system that is simple in design, inexpensive to manufacture and easy to install.

The invention is a linear guide system that includes two parallel longitudinally extending guides. The bottom end of each guide is supported by a stage base. At the opposite, top end, a plurality of pucks or sliders attach to each guide. In addition, a flexure is mounted to at least one of the pucks within the system wherein the flexure acts as a spring to absorb the horizontal movement of different parts of the guided motion system.

As the pucks move across the guides, any errors in the linear guides, pucks, or mounting surfaces will cause an increase of friction in the system. This increase in friction could lead to wear on the system thereby decreasing the reliability and life of the system. Therefore, the flexure is added to the system so that the guide system remains reliable and relatively stress free throughout operation. In addition, the flexure is designed to allow for movement and compliance in the horizontal direction while still maintaining bearing capacity in the vertical direction.

The guides on the motion system may include a fixed linear guide and a variable linear guide. The fixed linear guide is mounted so that the mounting base is in a horizontal plane. The variable linear guide can be mounted in any desired plane however, in most cases the mounting base is either in a horizontal plane or in a vertical plane. For example, one embodiment of the linear guide system the variable linear guide system is mounted in a horizontal plane while in a second embodiment of the invention the variable linear guide is mounted a vertical plane. In addition, these guides contain tracks to guide ball bearings located within the pucks.

In these two embodiments, there are two pucks for each guide. The pucks run along the guides resting on a plurality of ball bearings that run in the guide tracks. Furthermore, these pucks are separated into two sets. The first set of pucks are fixed to the movable slide plate via support blocks while a second set of pucks support the slide plate via flexures and slidable support blocks. In this design, the slidable support blocks provide vertical support while the flexures provide horizontal support for the slide plate.

In the first embodiment, the slidable support blocks each consist of a bottom flexure mounting block and a top flexure mounting block. The bottom flexure mounting block attaches to the puck while the top flexure mounting block attaches to the slide plate. Between the two blocks is an unencumbered flat surface that allows the two blocks to slide across each other horizontally with the flexure providing the horizontal resistance to sliding.

In the second embodiment of the invention, the slidable support blocks consist of a continuous flexure mounting block. The continuous flexure mounting block extends down from the slide plate and provides vertical support for the slide plate above the pucks. The continuous flexure mounting block has a flat bottom surface that allows it to slide horizontally across the puck while being stabilized horizontally by the flexure.

The flexure, a thin strip of spring steel, can deform elastically, and thus act as a spring inside the linear motion guide, dampening internal vibrations. In addition, the flexure can undergo plastic deformation to allow the slide plate to move into a new position relative to the pucks on the guide. Thus, unlike the prior art, the present invention includes a flexure that is simple in design that absorbs the internal stresses of the linear motion guide. In addition, this flexure provides firm support for the slide plate which allows the linear guide system to substantially maintain its precise position during operation.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference numerals denote similar elements throughout the several views:

FIG. 2 is an exploded perspective view of the first embodiment of the linear guide system;

FIG. 5 is an exploded perspective view of the linear guide system.

DETAILED DESCRIPTION OF PREFERRED EMBODIMENTS

Figure 1A:
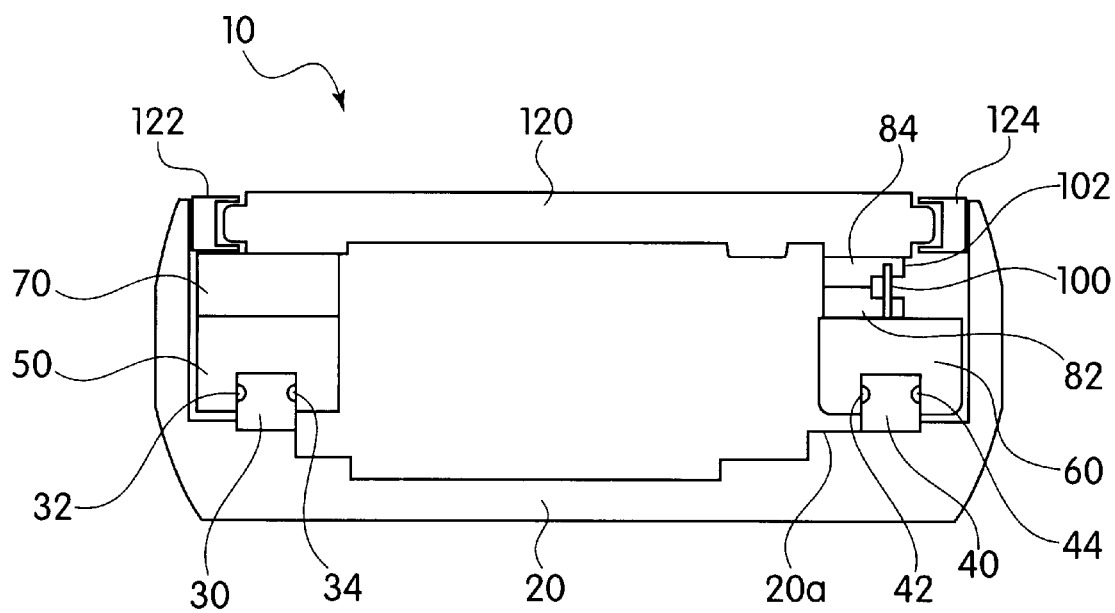
FIG. 1a is an end view of the first embodiment of the linear guide system.
Figure 1B:
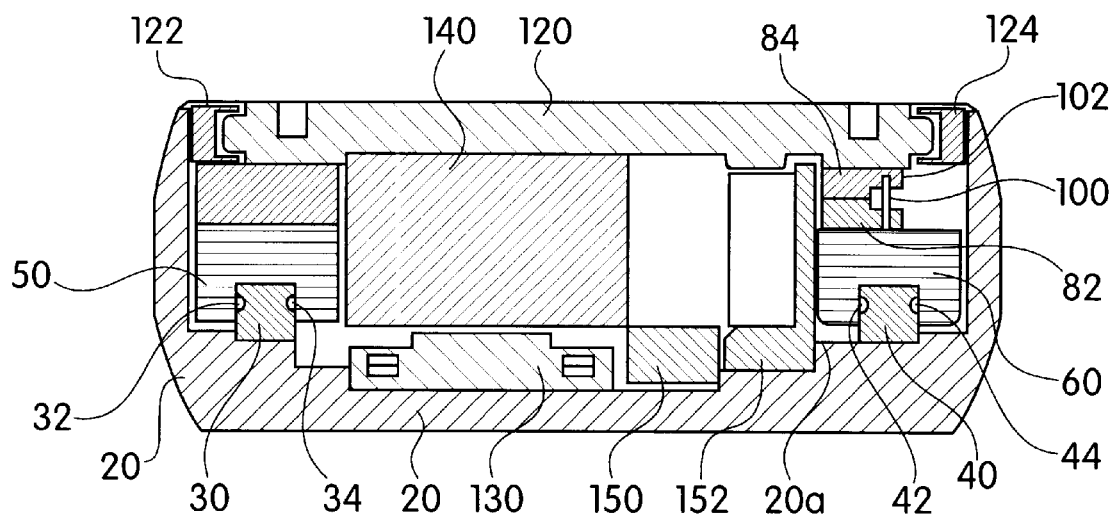
FIG. 1b is a cross sectional view of the first embodiment of the linear guide system.

Referring to FIGS. 1a, 1b, and 2, guide 10 contains a U-shaped base 20 that supports a left guide rail 30 and a right guide rail 40 on horizontal inner face 20a. Left guide rail 30 has a left track 32 and a right track 34, both for guiding ball bearings. Similarly, right track 42 and a left track 44 on guide 40 are designed to guide ball bearings.

Resting on guides 30 and 40 are U-shaped pucks or sliders 50 and 60. Pucks 50 and 60 contain ball bearings that are guided along the above mentioned tracks. Movable slide plate 120 moves with the pucks along guides 30 and 40. Slide plate 120 is supported on its right side above pucks 50 via vertical supports 70. In addition, slide plate 120 is supported above pucks 60 via bottom flexure mounting blocks 82 and top flexure mounting blocks 84. Finally, surrounding the left and right sides of slide plate 120 is left shield 122 and right shield 124, both attached to base 20.

When connecting slide plate 120 to pucks 50 and 60 there are four basic options. First, slide plate 120 can be rigidly fixed to both pucks 50 and 60 giving guide system 10 the rigidity necessary for the precise positioning of guide system 10, but little flexibility to counter internal stresses in system 10 during operation. In the second option, slide plate 120 can be rigidly fixed to one set of pucks 50 but have no horizontal stabilization on the other set of pucks 60. This design gives guide system 10 great flexibility but little rigidity. In the third option, slide plate 120 can be flexibly attached to pucks 50 and 60 via flexures 100 also giving guide system 10 great flexibility but lacking in the necessary rigidity for precise positioning. In general, flexures are designed to connect components together in a guide system while still maintaining some flexibility. However, the use of too many flexures within the system will result in a guide system lacking the necessary rigidity for a precise guide system.

Therefore, in the fourth option, the design of the present invention, slide plate 120 can be rigidly fixed to pucks 50, while being flexibly attached to pucks 60 via flexures 100. This fourth option gives guide system 10 the proper balance between the flexibility necessary to counter internal stresses on the system and the rigidity necessary for the precise positioning of slide plate 120.

To create this rigid connection between pucks 50 and slide plate 120, vertical supports 70 are fixed to both slide plate 120 and to pucks 50. As shown in FIG. 2, screws 134 are inserted through holes 132 to connect slide plate 120 to vertical supports 70. In this arrangement, vertical supports 70 provide rigid support in both the vertical and horizontal direction.

Figure 3:
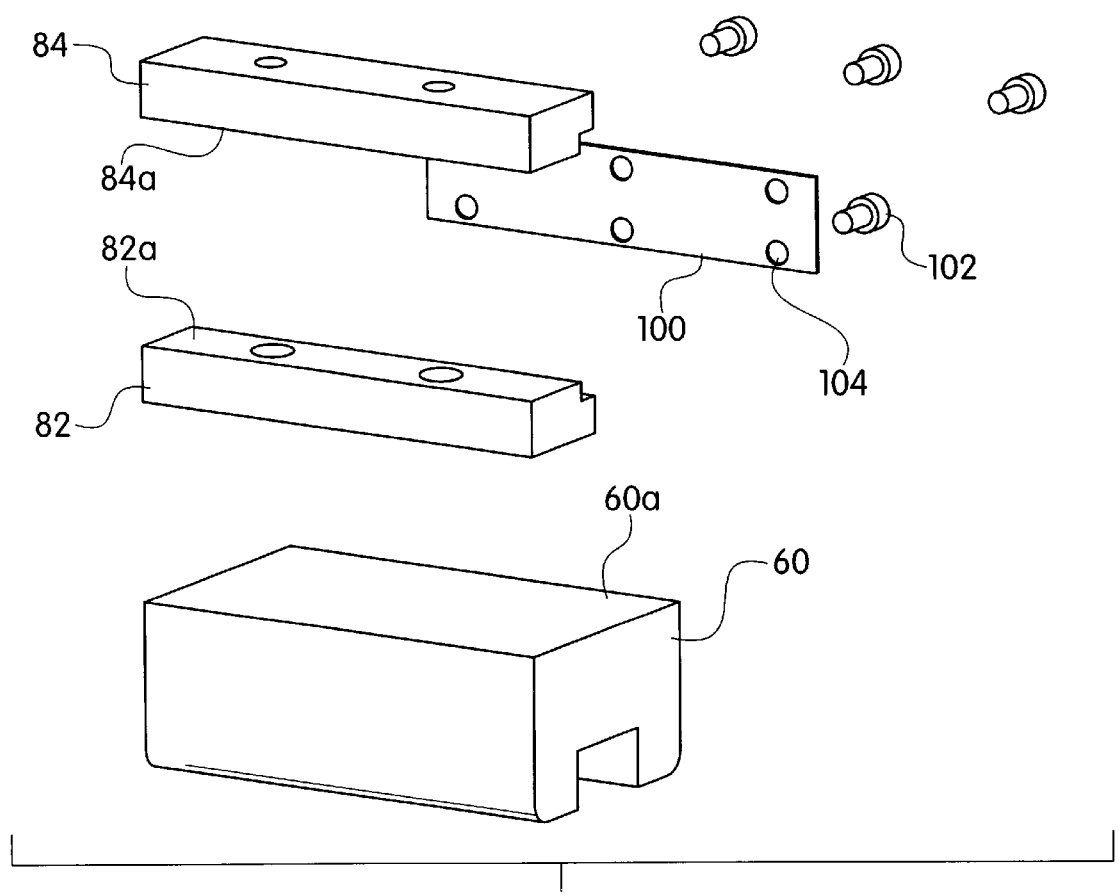
FIG. 3 is an exploded view of the flexure of the first embodiment of the invention.

To create a more flexible connection on the opposite side, screws 134 are inserted through holes 132 to connect slide plate 120 to top flexure mounting blocks 84. As shown in FIG. 3, top flexure mounting blocks 84 each have a flat bottom surface as shown by 84a that is supported vertically by bottom flexure mounting blocks 82, each having a top flat surface 82a. Since these mounting blocks 82 and 84 contact each other with a flat unencumbered surface, they provide limited horizontal support.

Therefore, to provide additional support, flexures 100 are bolted to bottom flexure mounting blocks 82 and top flexure mounting blocks 84 via screws 102. Screws 102 insert through holes 104 on flexures 100. These flexures 100 provide additional horizontal support for slide plate 120 on variable guide 40 while still allowing horizontal expansion or adjustment of slide plate 120.

In the present invention, flexures 100, are both novel in placement, and design. For example, by coupling flexures 100 to bottom flexure mounting blocks 82 and top flexure mounting blocks 84, blocks 82 and 84 handle any vertical stresses while flexures 100 handle any horizontal stress. Therefore, flexures 100 can provide consistent stress absorption and vibration dampening in the horizontal direction when the guide is in operation.

In addition, while the prior art contained complex flexures, flexures 100 are relatively simple in design. For example, flexures 100 are made from a thin strip of spring steel. This simple design allows flexures 100 to be manufactured less expensively than in previous guide systems.

This first embodiment is driven by an iron core linear motor which consists of a magnetic base plate 130 and a charged iron core drive 140. Drive 140 is attached to slide plate 120 and is powered by a power supply cable (not shown) that feeds into shielding 150. In addition, to shield puck 60 from iron core drive 140, an L-shaped shield 152 is mounted on horizontal face 20a.

When iron core drive 140 is charged, it moves along magnetic base plate 130 through induction. During operation, iron core drive may heat up causing other parts within system 10 to heat up. For example, if slide plate 120 were to increase in heat it would expand. Therefore, flexures 100 are provided to allow slide plate 120 to expand or adjust to the increase in heat while still maintaining rigidity in system 10.

Figure 4A:
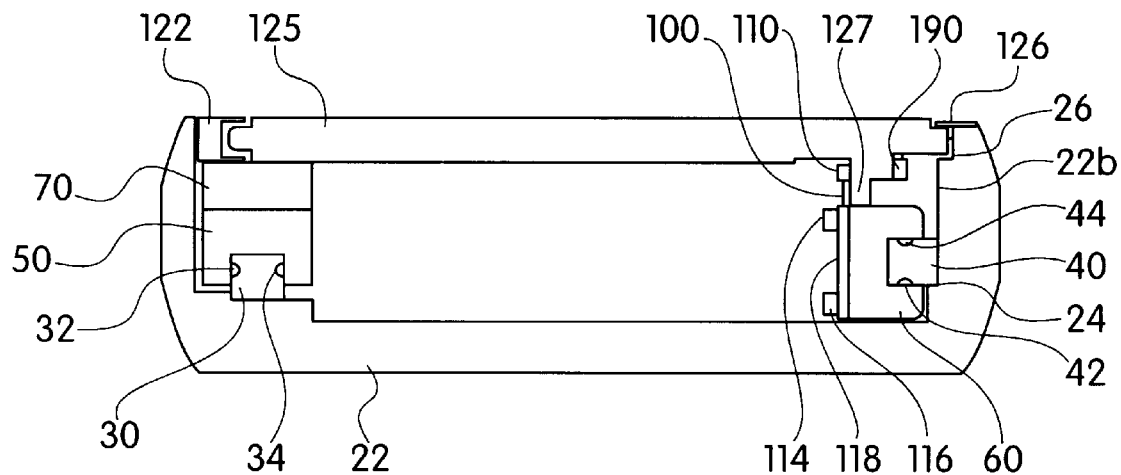
FIG. 4a is an end view of the second embodiment of the linear guide system.
Figure 4B:
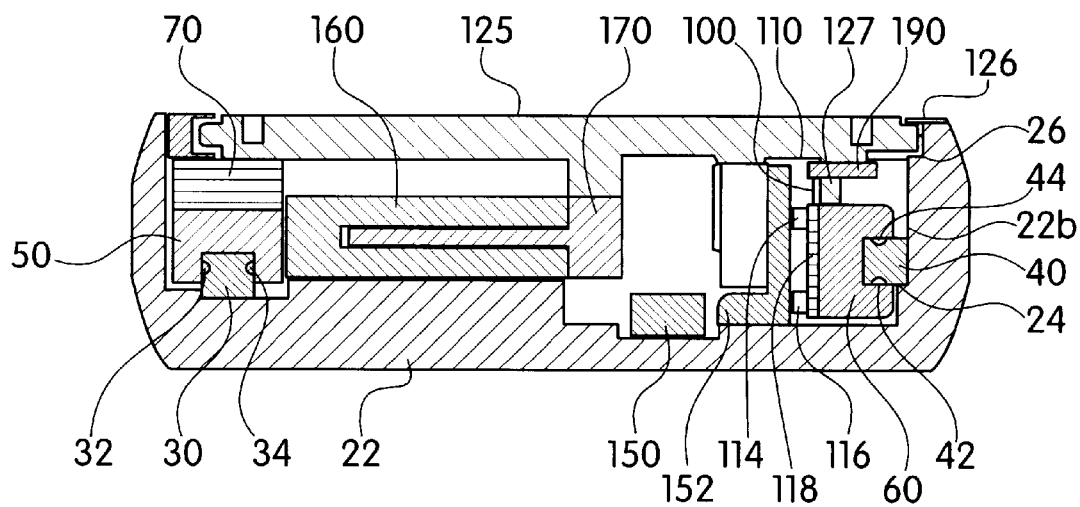
FIG. 4b is a cross sectional view of the second embodiment of the linear guide system.

In FIGS. 4a, 4b, and 5, the second embodiment of the invention, variable linear guide 40 is mounted to a vertical inner face 22b on stage base 22. Vertical inner face 22b has two ridges, 24 and 26. Ridge 24 that acts as a reference surface for rail 40 while ridge 26 provides a cut-away to make room for slide plate 125. In addition, the left and right edges of slide plate 125 are shielded by left shield 122 and right shield 126.

Since variable linear guide 40 is mounted on vertical face 22b of base plate 22, ball bearing track 42 is on a bottom face of guide 40, and ball bearing track 44 is on a top face of guide 40. Pucks 60 are mounted to guide 40. In this second embodiment, movable slide plate 125 differs from movable slide plate 120 in that it has a vertical support 127 extending down to pucks 60. As shown in FIG. 5, vertical support 127 has a bottom flat face 127a that contacts pucks 60 on their top sides 60b. Because face 127a is flat, it slides unencumbered across top face 60b when slide plate 125 expands or adjusts in a horizontal direction. To provide additional horizontal support, flexures 100 connect to vertical support 127 via screws 190 and top connection bracket 110. Flexures 100 connect to pucks 60 via bottom connection brackets 118 and screws 114. In this design, vertical support 127 handles the vertical support of slide plate 125 leaving flexures 100 to support slide plate 125 in the horizontal direction. Unlike the prior art, flexures 100 are relatively free of any vertical stress and can therefore provide consistent, unhindered support in the horizontal direction.

In this second embodiment of the invention, slide plate 125 is driven by an epoxy core linear motor. This linear motor comprises a U-shaped electromagnet 160 and an epoxy plate 170 housed within electromagnet 160. The motor drives slide plate 125 along guides 30 and 40 to a desired position. During operation, the motor may increase in heat, causing parts within linear guide 10 to heat up. As these parts heat up, they will expand horizontally. Therefore, guide system 10 is provided with flexures 100 to allow parts to expand horizontally while still maintaining rigidity within the system.

While two embodiments of the present invention have been shown and described, it is to be understood that many changes and modifications may be made thereunto without departing from the spirit and scope of the invention as defined in the appended claims.

What is claimed is:

1. A linear guide system comprising:

at least two longitudinally extending parallel guides having a first track located on a first face on each of said guides, and a second track located on an opposite face on said guides;

a base supporting said parallel guides;

a plurality of pucks slidably attached to said at least two parallel guides;

at least one movable slide plate positioned above said pucks;

a plurality of slide plate supports, each support having a bottom face and a top face, said bottom face facing a plurality of pucks and said top face attached to said slide plate; and at least one flexure located between said slide plate and said pucks, said at least one flexure providing additional support within the system and designed to absorb vibration and internal stresses in the system.

2. The system as claimed in claim 1, wherein said plurality of slide plate supports includes a first set of supports fixing said at least one slide plate horizontally and vertically to said plurality of pucks and a second set of supports fixing said slide plate only vertically above said plurality of pucks.

3. The system as claimed in claim 2, wherein said flexure has a first end attached to said second set of slide plate supports and a second end attached to said plurality of pucks adjacent to said second set of supports.

4. The system as claimed in claim 3, wherein said second set of slide plate supports includes a bottom flexure mounting block and a top flexure mounting block, wherein said bottom flexure mounting block has a bottom face that attaches to said plurality of pucks and a flat top face, and said top flexure mounting block has a top face that attaches to said at least one slide plate and a flat bottom face resting on said top face of said bottom flexure mounting block forming an unencumbered interface wherein said top flexure mounting block slides horizontally across said bottom flexure mounting block in response to internal stress on said system.

5. The system as claimed in claim 4, wherein said flexure has a first end attached to said top flexure mounting block and a second end attached to said bottom flexure mounting block to provide horizontal support for said at least one slide plate.

* * * * *